Patented Mar. 26, 1935

1,995,970

UNITED STATES PATENT OFFICE 1,995,970

POLYMERIC LACTIDE RESIN

George Lowrance Dorough, Wilmington, Del., assignor to E. I. du Pont de Nemours & Company, Wilmington, Del., a corporation of Delaware No Drawing. Application April 4, 1931, Serial No. 527,854

6 Claims. (Cl. 260—2)

This invention relates to new resins and more particularly it relates to polymeric lactide resins and compositions comprising these resins.

While it has been proposed to manufacture resins from lactic acid, the products and resins produced by the prior processes for treating lactic acid do not possess the physical characteristics and desirable film forming properties of the resins herein disclosed.

This invention has as an object, therefore, the production of new lactide resins. A further object is the production of new compositions of matter, particularly coating compositions comprising these resins. A still further object resides in a new process for the manufacture of lactide resins.

My new resins may be made either from lactic acid or from monomeric lactide. The preparation of these resins from lactic acid solutions involves the concentration of the solution by distilling off the water, the polymerization of the hydroxy acid by an intermolecular condensation, and finally the removal of the lower molecular weight compounds from the resinous mass. When the resin is made from monomeric lactide the process involves a polymerization to a high molecular weight mass and the removal of the low molecular weight materials from the resin.

The concentration of the lactic acid, in the initial step for producing the resin, is preferably conducted at about 150° C., but I may use temperatures as low as 100° C. and up to about 200° C., although at the higher temperature considerable loss of lactic acid occurs. When it is desired that the resin be highly polymerized and exhibit the most desirable properties, the polymerization step is preferably conducted between 273° C. and 300° C. which approaches the temperature at which decomposition of a polymerized product begins to occur. Decomposition of the polymerized product is indicated by the evolution of volatile materials which are gaseous at the temperature at which the decomposition takes place. Acetaldehyde, for example, may be trapped and identified when decomposition of the polymerized product takes place. Temperatures as low as 250° C. may, however, be used for the polymerization step with results satisfactory for some purposes. The final step, which constitutes an important part of my process, consists in removing the low molecular weight material at low pressures and at a temperature just sufficient at the particular pressure used to remove these objectionable materials by distillation. Low pressure is used in this step to lower the boiling point of the objectionable low molecular weight material, comprising chiefly lactide (B. P. 255° C.) so that this material may be removed as rapidly as possible and thereby prevent decomposition of the high molecular weight material. The pressure should preferably be below 100 mm. of mercury and the temperature preferably lies within the range of 250° C. to 350° C. The polymerization and distillation of monomeric lactide for the production of the resin is conducted under substantially the same conditions of temperature and pressure as those indicated above. The following examples are illustrative of the method of carrying out my invention:

Example I 400 g. of purified technical lactic acid 85% was placed in a three-neck round bottom flask of one liter capacity equipped with a mechanical stirrer and condenser for distillation. This flask was heated in a bath at 150° for thirty minutes. The temperature was then raised to 275–300° and the heating continued for forty-five minutes. The temperature of the bath was then raised to 300° and the pressure of the system reduced to 70 mm. These conditions were maintained for 15 minutes. The heating bath was removed and the pressure reduced to 20 mm. The monomeric lactide distilled out and solidified in the receivers.

The residue was resinous. The yield was 165 g. of resin or 60% of theoretical. The monomeric lactide collected weighed 51 g. The total lactide (polymeric and monomeric) was 79% of theoretical.

Example II

The procedure described in Example I above, was followed. 400 g. of purified lactic acid of 80% concentration yielded 176 g. of resin and 45 g. of monomeric lactide. This represents an 85% yield on the basis of monomeric and polymeric lactide.

Example III 100 g. of monomeric lactide was placed in a three-neck flask of one liter capacity equipped with a mechanical stirrer and a condenser for distillation. This was placed in a bath at 275° and heated for forty-five minutes. The temperature was raised to 300° and the heating continued for fifteen minutes. The heating bath was removed and the pressure reduced to 10 mm. The monomeric lactide distilled into the receiver and the resin remained in the flask. The resin obtained was 74 g. or 74%, the monomeric lactide, 14 g. or 14%. The total yield of lactide (monomeric and polymeric) represented 88% of theoretical.

Through the practice of the present process, high yields of the resin may be easily and economically obtained from all grades and concentrations of lactic acid.

When the resin is made from lactic acid, the initial heating of the dehydrated acid during the first part of the polymerization step results in the formation of monomeric lactide which is polymerized as the heating proceeds. It will be apparent, therefore, that whether my new resin is made from lactic acid or the lactide as the initial material, the process in either case comprises the polymerization of lactide and the subsequent removal by distillation of the low molecular weight material.

The removal of the monomeric lactide from the resin by heating under reduced pressure results in a marked improvement in the durability of the films from the resin. This low molecular weight material can in turn be polymerized.

The polymeric lactide resins prepared as disclosed herein are quite hard and brittle. Their color depends somewhat upon the purity of the raw materials used, being almost colorless when U. S. P. or C. P. acid is used and darker when edible and technical grades of acid are used. Samples of resins which exhibit good properties in films soften at temperatures around 80–100° C. Average molecular weight values were found to be about 3000–4000. Films of this resin are quite water resistant if all of the volatilizable low molecular weight lactide has been removed. The resin is soluble in ethyl or methyl alcohol, acetone, benzene, toluene and esters of all kinds. The resin is soluble in and compatible with softeners and plasticizers of the ester type (dibutyl phthalate, etc.).

My new polylactide resins are compatible with cellulose derivatives such as nitrocellulose, cellulose acetate, and other esters and ethers of cellulose. They are also compatible with various natural resins, and when combined with cellulose derivatives are more or less compatible with synthetic resins such as those of the polyhydric alcohol-polybasic acid type. These resins are also compatible with damar resin. The resins are particularly useful in coating compositions, impregnating compositions, and molding compositions containing cellulose derivatives and natural or synthetic resins of the type mentioned.

Lacquers containing my new polylactide resins, nitrocellulose and dibutyl phthalate have shown by test to possess a better durability than control lacquers formulated with damar gum. The quality of the film is considerably improved by the addition of a suitable softener.

Preparations of nitrocellulose, polylactide resin and dibutyl phthalate which have been used in formulating lacquers that I have tested for durability are given in the following table:

Example IV

| Nitrocellulose | Polylactide resin | Dibutyl phthalate |
|---|---|---|
| Parts by weight | Parts by weight | Parts by weight |
| 4 | 1 | 0 |
| 4 | 2 | 0 |
| 4 | 1 | 2 |
| 4 | 2 | 2 |
| 4 | 4 | 2 |
| 1 | 4 | 2 |

The polylactide resins are also compatible with cellulose acetate and the coating compositions made therefrom show films of high durability. Suitable ratios of cellulose acetate and polylactide resin for use in these compositions are indicated in the following example:

Example V

| Parts cellulose acetate | Parts polylactide resin |
|---|---|
| 4 | 1 |
| 4 | 2 |
| 4 | 4 |

Coating compositions which yield films of good quality may be made from nitrocellulose and mixtures of my new resins and those of the oil modified polyhydric alcohol-polybasic acid type. Suitable nitrocellulose compositions containing these resins are as follows:

Example VI

| Nitrocellulose | Resin | Polylactide resin | Dibutyl phthalate |
|---|---|---|---|
| Parts | Parts | Parts | Parts |
| 4 | 2 (A) | 2 | 2 |
| 4 | 2 (B) | 2 | 2 |
| 4 | 2 (C) | 2 | 2 |

The compositions of resins A, B and C, and the mode of their manufacture is as follows:

Resin A

|  | Per cent |
|---|---|
| Glycerol | 24.2 |
| Phthalic anhydride | 54.3 |
| Castor oil | 21.5 |

Acid number, 70–75

The ingredients were mixed and heated at 180–225° C. until the resulting resinous material showed an acid number of 70–75.

Resin B

|  | Per cent |
|---|---|
| Glycerol | 19.87 |
| Phthalic anhydride | 36.52 |
| Linseed oil acids | 31.15 |
| China wood oil acids | 12.46 |

Acid number, 40–45

The ingredients were mixed and heated at 185–220° C. until the resulting resinous material showed an acid number of 40–45.

Resin C

|  | Per cent |
|---|---|
| Glycerol | 17.11 |
| Phthalic anhydride | 27.09 |
| Linseed oil acids | 55.80 |

Acid number, 20–25

The ingredients were mixed and heated at 225–250° C. until the acid number was approximately 20–25.

The value of these polylactide resins in impregnating compositions may be noted from the fact that paper impregnated with compositions consisting of polylactide resin, nitrocellulose and dibutyl phthalate exhibits a much higher resistance to tear after impregnation. These polylactide resins may also be of use as adhesives for glass and wood as well as coating and impregnating agents for fabrics. Various other uses will present themselves to those skilled in the art.

As many apparently widely different embodiments of this invention may be made without departing from the spirit and scope thereof, it is to be understood that I do not limit myself to the specific embodiments thereof except as defined in the following claims.

I claim:

1. A process for making a resin which comprises polymerizing lactide by heating it within the range of 250° C. to about a temperature approaching that at which decomposition of the polymerized product begins to occur, and further heating the polymerized product within said temperature range and at a pressure below 100 mm. of mercury.

2. A process for making a resin which comprises heating lactide within the range of about 273° C. to 300° C. until polymerization occurs, and further heating the polymerized product within said temperature range and at a pressure below 100 mm. of mercury.

3. A process for making a resin which comprises heating lactide at a temperature within the range of about 273° C. to 300° C. for about 60 minutes, and continuing the heating at a pressure not greater than about 20 mm. of mercury.

4. A process for making a resin which comprises concentrating aqueous lactic acid above 100° C., heating the concentrated acid at a temperature within the range of about 250° C. to about 300° C. until polymerization occurs, and distilling off the lactide by heating the polymerized product within said temperature range and at a pressure below 100 mm. of mercury.

5. A process for making a resin which comprises concentrating aqueous lactic acid at about 150° C., heating the concentrated acid at a temperature within the range of about 273° C. to about 300° C. for approximately 45 minutes, continuing the heating approximately 15 minutes at about 300° C. under a pressure of about 70 mm. of mercury, and continuing the heating at a pressure not greater than about 20 mm. of mercury.

6. A resin having a melting point of 80° C. to 100° C. which comprises polymerized lactide substantially free from unpolymerized lactide, said resin being obtainable by polymerizing lactide by heating it within the range of about 250° C. to a temperature approaching that at which decomposition of the polymerized product begins to occur, and further heating the polymerized product within said temperature range and at a pressure below 100 mm. of mercury.

GEORGE LOWRANCE DOROUGH.